(12) United States Patent
Kim

(10) Patent No.: US 12,411,644 B2
(45) Date of Patent: Sep. 9, 2025

(54) ROLLABLE DISPLAY APPARATUS

(71) Applicant: HYUNDAI MOBIS CO., LTD., Seoul (KR)

(72) Inventor: Shin Yeong Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 18/637,945

(22) Filed: Apr. 17, 2024

(65) Prior Publication Data
US 2024/0378008 A1 Nov. 14, 2024

(30) Foreign Application Priority Data

May 8, 2023 (KR) .................. 10-2023-0058928
May 16, 2023 (KR) .................. 10-2023-0063026

(51) Int. Cl.
*G06F 3/14* (2006.01)
*G09G 3/00* (2006.01)

(52) U.S. Cl.
CPC .......... *G06F 3/1446* (2013.01); *G09G 3/035* (2020.08); *G09G 2300/026* (2013.01); *G09G 2380/10* (2013.01)

(58) Field of Classification Search
CPC ............. G06F 3/1446; G09G 3/035; G09G 2300/026; G09G 2380/10
See application file for complete search history.

(56) References Cited

U.S. PATENT DOCUMENTS

| | | | | |
|---|---|---|---|---|
| 2,791,272 | A | * | 5/1957 | Stehlik ............... B60J 1/2052 296/97.7 |
| 4,762,358 | A | * | 8/1988 | Levosky ............ B60J 1/2063 296/97.7 |
| 6,131,986 | A | * | 10/2000 | Rosen ................ B60J 3/0208 296/97.12 |
| 6,503,188 | B1 | * | 1/2003 | August .............. A47C 21/00 248/466 |
| 7,143,805 | B1 | * | 12/2006 | Weir .................. B60J 1/2069 160/370.22 |
| 9,272,671 | B2 | * | 3/2016 | Vander Sluis ..... B60R 11/0235 |
| 2012/0002357 | A1 | * | 1/2012 | Auld .................. G09F 11/30 361/679.01 |
| 2012/0268665 | A1 | * | 10/2012 | Yetukuri ........... B60R 11/0235 348/837 |
| 2013/0201208 | A1 | * | 8/2013 | Cho ................... G06F 3/0488 345/619 |
| 2013/0203469 | A1 | * | 8/2013 | Cho ................... H04M 1/0268 345/173 |

(Continued)

*Primary Examiner* — Christopher E Leiby
(74) *Attorney, Agent, or Firm* — Morgan, Lewis & Bockius LLP

(57) ABSTRACT

A rollable display apparatus including: a display panel configured to display a video; a rolling part located at one end of the display panel and including an internal space in which the display panel is rolled and accommodated; a supporter located at another end of the display panel; and an anchor body configured such that at least one area of the rolling part and at least one area of the supporter are detachable from the anchor body, and comprising a plurality of anchor areas configured to maintain an unrolled state of the display panel when the at least one area of the rolling part and the at least one area of the supporter are attached to the anchor body.

9 Claims, 17 Drawing Sheets

(56) References Cited

U.S. PATENT DOCUMENTS

| | | | |
|---|---|---|---|
| 2014/0263511 A1* | 9/2014 | Clements | B60R 7/06 |
| | | | 224/483 |
| 2016/0068113 A1* | 3/2016 | Clements | B60R 11/02 |
| | | | 224/483 |
| 2018/0068612 A1* | 3/2018 | Cho | G09G 3/035 |
| 2018/0364827 A1* | 12/2018 | Chung | G06F 1/1677 |
| 2019/0012008 A1* | 1/2019 | Yoon | G06F 1/1652 |
| 2019/0197960 A1* | 6/2019 | Kim | G09G 3/035 |
| 2019/0355923 A1* | 11/2019 | Kishimoto | G09F 9/00 |
| 2020/0135535 A1* | 4/2020 | Li | H01L 21/68728 |
| 2020/0170114 A1* | 5/2020 | Choi | G09F 9/301 |
| 2021/0206270 A1* | 7/2021 | Diboine | B60K 35/10 |
| 2023/0031862 A1* | 2/2023 | Szczerba | G09F 9/301 |
| 2023/0050312 A1* | 2/2023 | Guzel | G09G 3/32 |
| 2023/0206860 A1* | 6/2023 | Lee | G09G 3/3266 |

* cited by examiner

ROLLABLE DISPLAY APPARATUS

CROSS-REFERENCE TO RELATED APPLICATION

The present application claims priority to Patent Applications No. 10-2023-0063026, filed on May 16, 2023 in Korea, and No. 10-2023-0058928, filed on May 8, 2023 in Korea the entire contents of which are incorporated herein by reference.

TECHNICAL FIELD

The present disclosure relates to a rollable display apparatus.

BACKGROUND

The content described in this section simply provides background information for the present disclosure and does not constitute related art.

A display apparatus is a device for visually displaying information. The display apparatus may be used in computers, mobile devices, televisions, watches, vehicles, and the like. The display apparatus is used in a vehicle so that various types of content such as driving information of a vehicle, vehicle status, and entertainment can be provided to a user.

A plurality of display apparatus used in a vehicle may be required to provide various types of content. Accordingly, in the related art, a plurality of display apparatus are mounted at several positions inside a vehicle. Such display apparatus have problems in that a user cannot select the number of display apparatus, it is difficult to cope with a malfunction of the display apparatus, and a lot of an inner space of the vehicle is occupied.

A display of the related art is rolled or slid in one direction so that a display screen is exposed. Therefore, when infotainment is provided using a display disposed in a vehicle, occupants in the vehicle can view only video information corresponding to a maximum size of the display. The display is limited in size because the display is rolled or slid in one direction. Therefore, there is a problem that the sense of immersion of a video is degraded and emotional quality is degraded.

SUMMARY

Therefore, the present disclosure is intended to solve these problems, and a main object of the present disclosure is to provide a display apparatus that allows the number of display apparatus to be selected depending on a user's need, allows malfunctions of the display apparatus to be easily coped, and allows utilization of an inner space of a vehicle to be maximized.

A rollable display apparatus and control method therefor according to another embodiment can provide video information of various display sizes and video ratios on the basis of an integration form of a plurality of displays.

A rollable display apparatus and control method according to another embodiment can form an integrated display by using integration between a plurality of displays to form an improved video ratio and display size, thereby increasing the sense of immersion in a video.

As described above, according to the present embodiment, there is an effect that it is possible to select the number of display apparatus depending on a user's need, easily cope with malfunctions of the display apparatus, and maximize the utilization of the inner space of a vehicle.

As described above, according to another embodiment, the rollable display apparatus and control method therefor have an effect that it is possible to provide video information of various display sizes and video ratios on the basis of the integration form of the plurality of displays.

As described above, according to another embodiment, the rollable display apparatus and control method therefor have an effect that it is possible to form the integrated display by using the integration between the plurality of displays to form an improved video ratio and display size, thereby increasing the sense of immersion in a video.

DETAILED DESCRIPTION

A rollable display apparatus 100 or 400 according to the present disclosure may be mounted on a vehicle such as a car. The rollable display apparatus 100 or 400 according to the present disclosure may be a liquid crystal display apparatus (LDC), a quantum dot display apparatus (QD), a field emission display apparatus (FED), an electro-wetting display apparatus (EWD), an organic light emitting display apparatus (OLED), or the like. However, the rollable display apparatus 100 or 400 according to the present disclosure is not limited to the above-described display apparatus.

In the present disclosure, the term rolling a display panel refers to winding the display panel. In the present disclosure, the term unrolling the display panel refers to unfolding a portion of the display panel and discharging the portion from a rolling part.

In the present disclosure, the term user refers to a person who uses the rollable display apparatus 100 or 400 according to the present disclosure or a device (for example, artificial intelligence) that uses the rollable display apparatus 100 or 400 according to the present disclosure. Accordingly, the term user may include a driver of the vehicle and an occupant of the vehicle.

Figure 1:
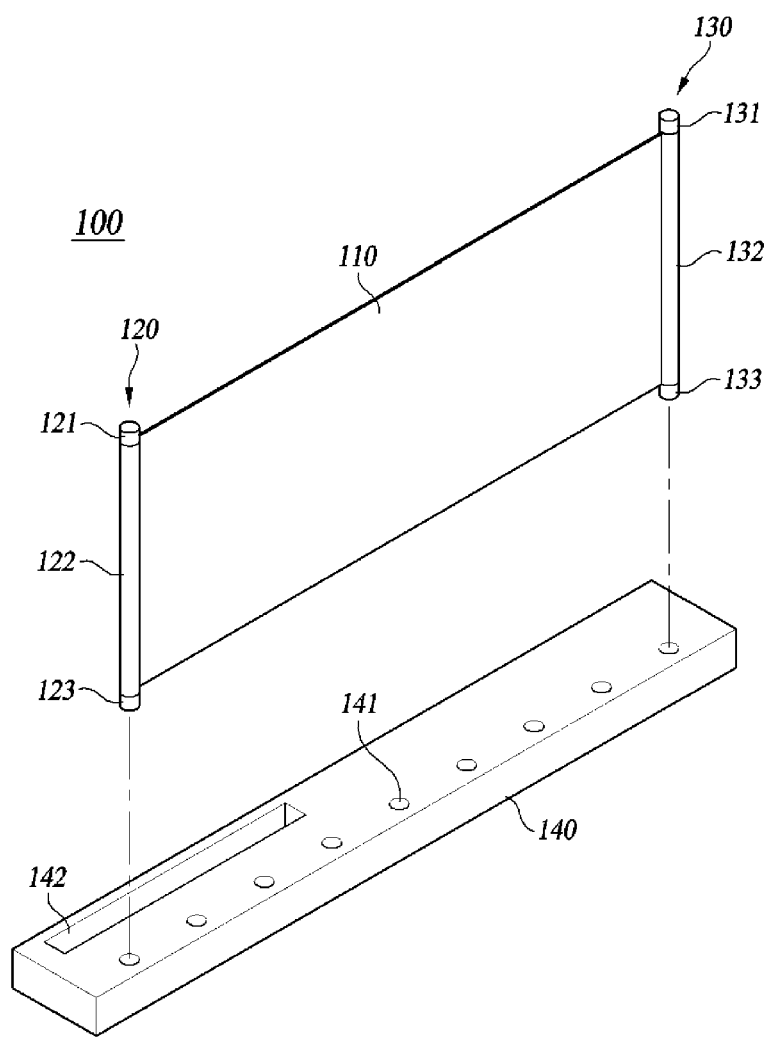
FIG. 1 is a perspective view of a rollable display apparatus according to a first embodiment of the present disclosure.

FIG. 1 is a perspective view of the rollable display apparatus according to a first embodiment of the present disclosure.

Figure 2:
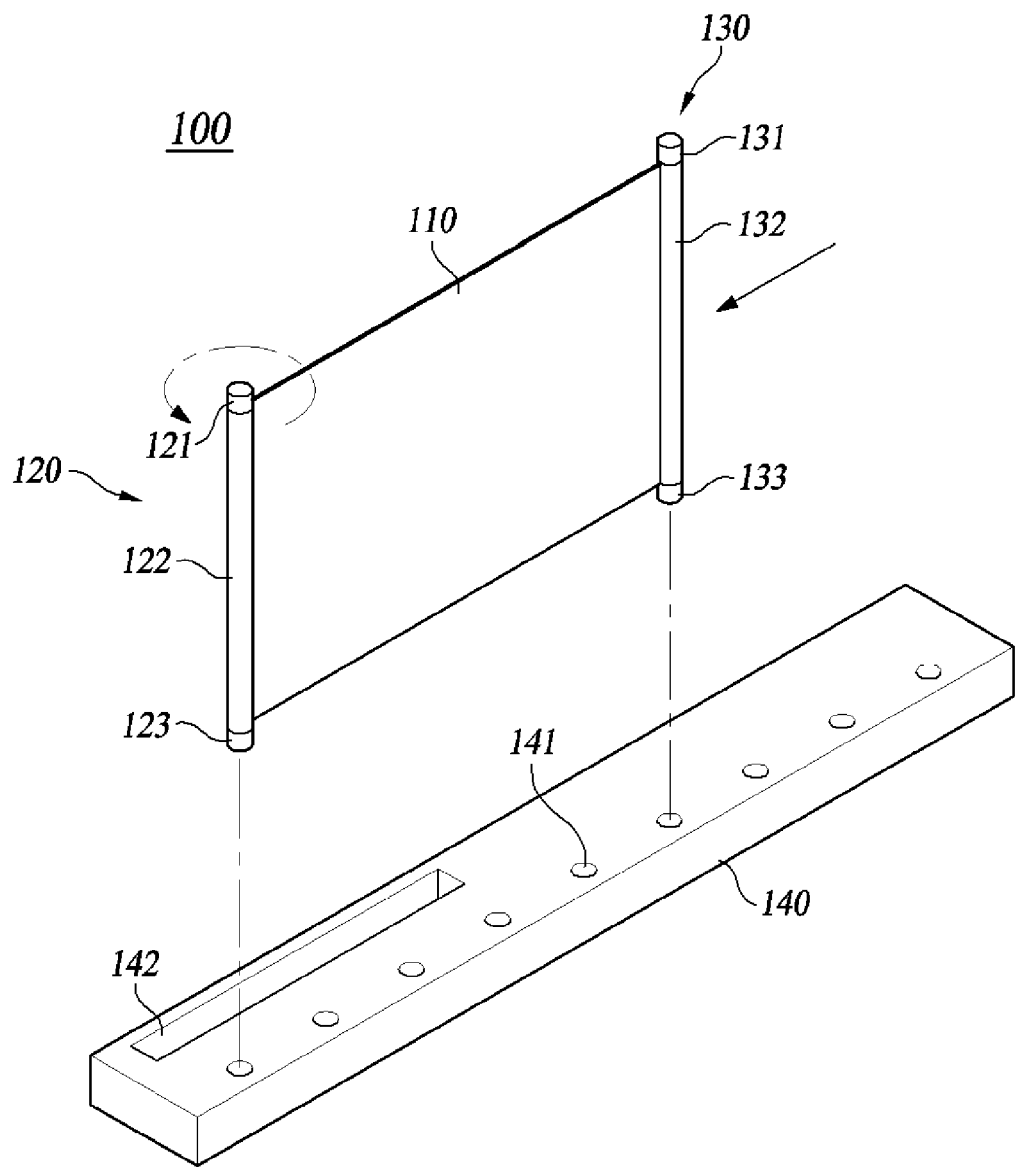
FIG. 2 is a diagram illustrating an operating state of the rollable display apparatus according to the first embodiment of the present disclosure.

FIG. 2 is a diagram illustrating an operating state of the rollable display apparatus according to the first embodiment of the present disclosure.

Figure 3:
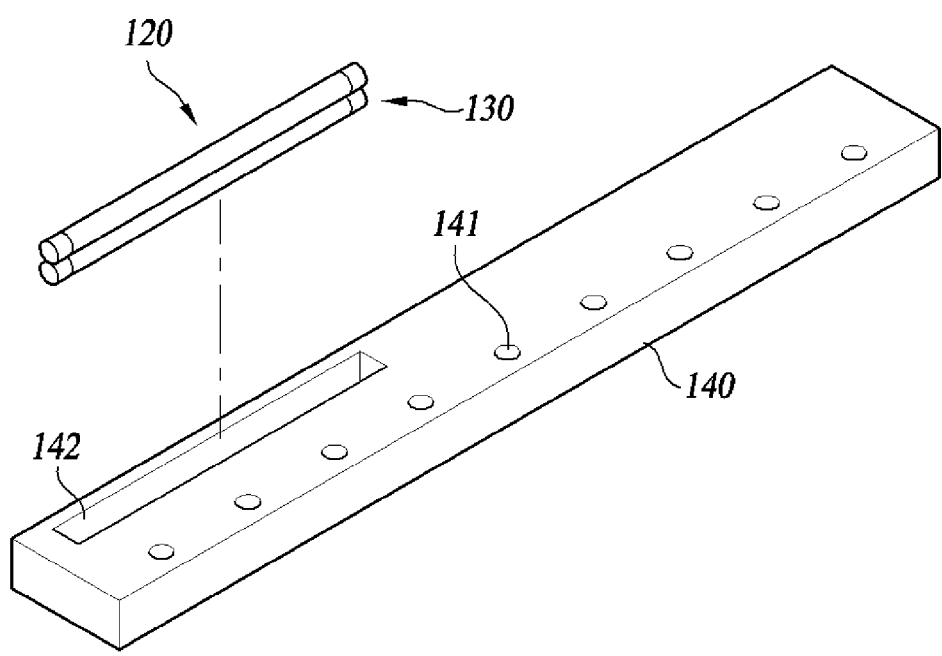
FIG. 3 is a diagram illustrating a form in which a rolling part and a supporter are accommodated in an internal space of an anchor body according to the first embodiment of the present disclosure.

FIG. 3 is a diagram illustrating a form in which a rolling part and a supporter are accommodated in an internal space of an anchor body according to the first embodiment of the present disclosure.

Figure 5:
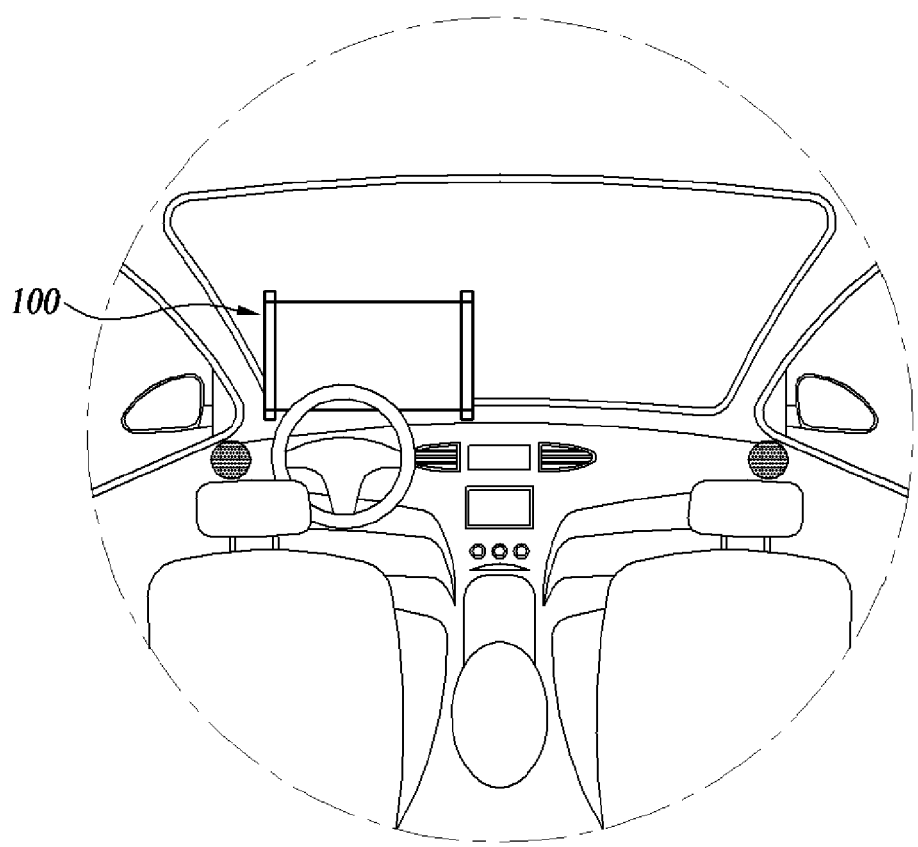
FIGS. 5 to 8 are diagrams illustrating examples in which the rollable display apparatus are mounted at various positions according to the first embodiment of the present disclosure.
Figure 6:
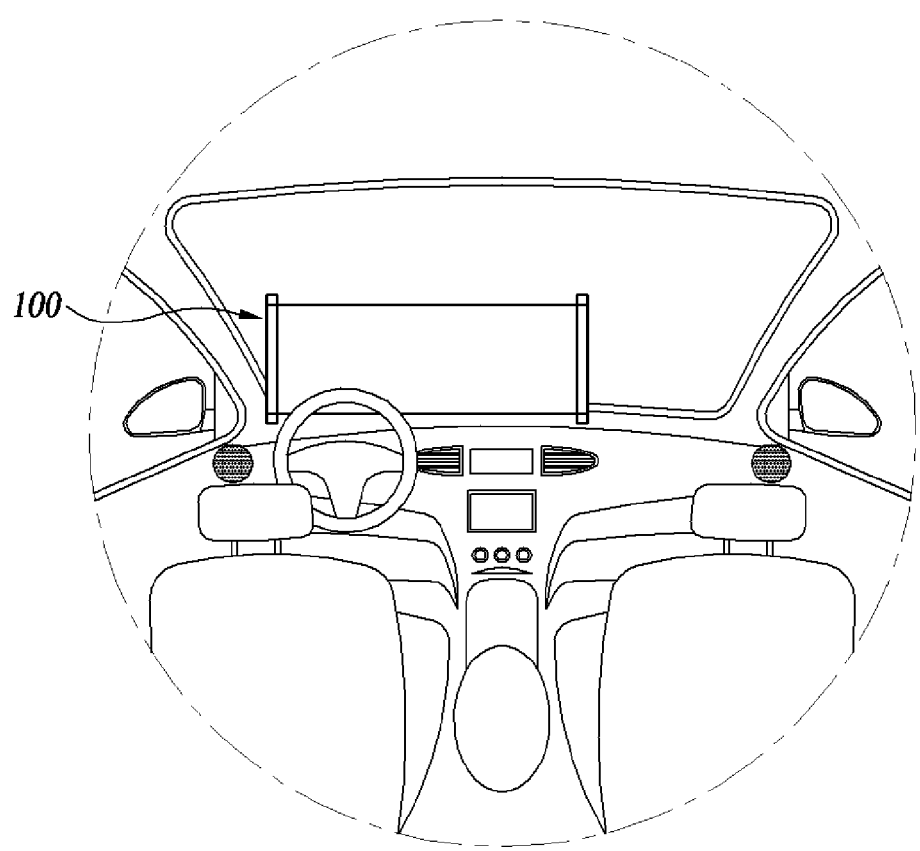
Figure 7:
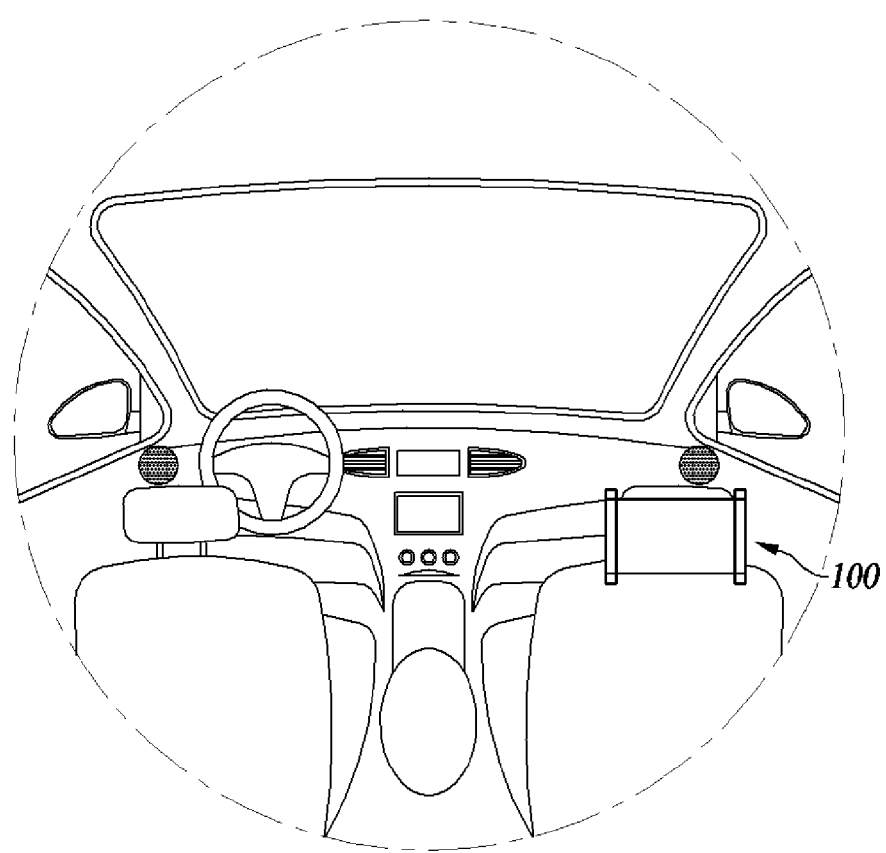
Figure 8:
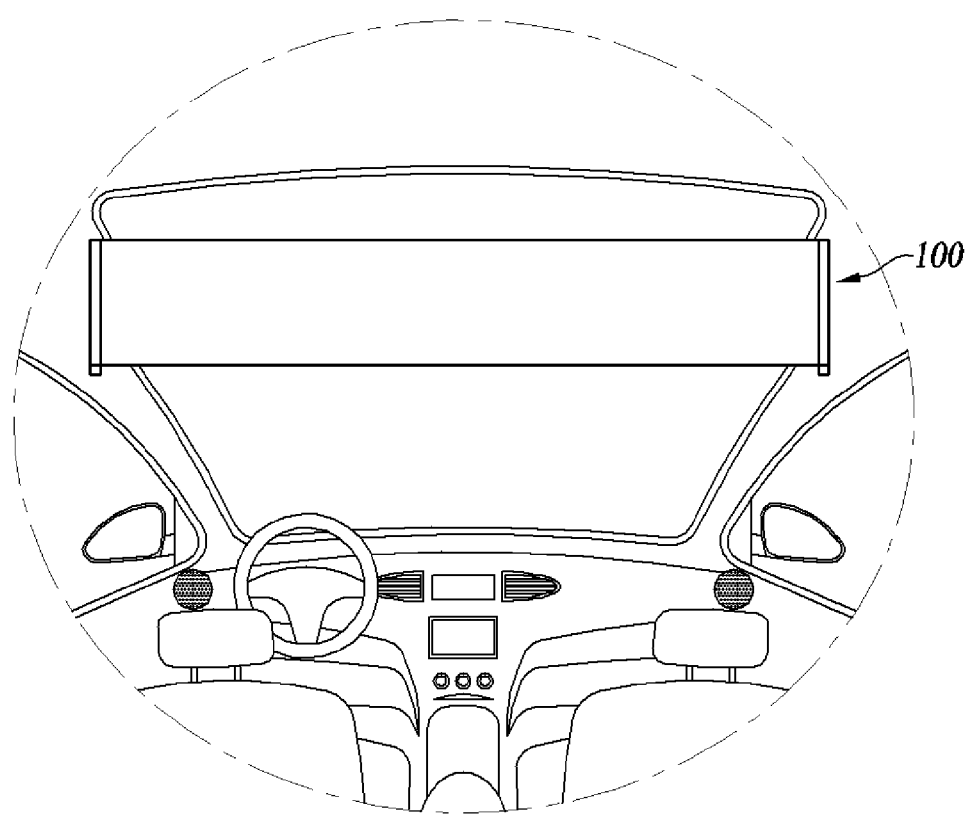

FIGS. 5 to 8 are diagrams illustrating examples in which the rollable display apparatus is mounted at various positions according to the first embodiment of the present disclosure. To be specific, FIG. 5 is a diagram illustrating a form in which the rollable display apparatus is mounted at a cluster position of a vehicle according to the first embodiment of the present disclosure. FIG. 6 is a diagram illustrating a form in which the rollable display apparatus is mounted on a cluster of the vehicle and a center fascia position of the vehicle according to the first embodiment of the present disclosure. FIG. 7 is a diagram illustrating a form in which the rollable display apparatus is mounted on a rear part of a seat of the vehicle according to the first embodiment of the present disclosure. FIG. 8 is a diagram illustrating a form in which the rollable display apparatus is mounted on a ceiling of a vehicle according to the first embodiment of the present disclosure.

Referring to FIGS. 1 to 3 and 5 to 8, the rollable display apparatus 100 according to the first embodiment of the present disclosure may include all or some of a display panel 110, a rolling part 120, a supporter 130, a plurality of anchor areas 141, and an anchor body 140.

The display panel 110 may display a video or image to the user. The display panel 110 may display a screen for information on the vehicle, a forward side of the vehicle, and entertainment. The display panel 110 may include several components for displaying the screen. The display panel 110 may include flexible characteristics in at least one area of the display panel 110.

The rolling part 120 may be located at one end of the display panel 110. Here, the one end of the display panel 110 is an edge of the end of the display panel 110. The rolling part 120 may include an internal space in which the display panel 110 is rolled and accommodated. The rolling part 120 may be a long bar. A length of the rolling part 120 may be longer than the length of the one end of the display panel 110. The rolling part 120 may be divided into a plurality of parts 121, 122, and 123. For example, as can be seen in FIG. 1, the rolling part 120 may be divided into a first part 121, a second part 122, and a third part 123. At least one of the plurality of parts 121, 122, and 123 of the rolling part 120 may include a first connector (not illustrated). For example, the first connector may be included in the first part 121 and the third part 123. However, the part in which the first connector is included is not limited to the above-described example.

The first connector may be configured to transmit or receive an electrical signal to or from the display panel 110. For example, the first connector may be configured to receive an electrical signal from the outside of the display panel 110 to the display panel 110. The first connector may be configured to transmit an electrical signal from the display panel 110 to the outside of the display panel 110. In order for the first connector to transmit or receive an electrical signal to or from the display panel 110, the first connector may be connected to the display panel 110 using a wire. Alternatively, the first connector may be connected to the display panel 110 using short range wireless communication. The first connector may be configured to be electrically connected to a second connector (not illustrated), which will be described below.

The supporter 130 may be located at the other end of the display panel 110. Here, the other end of the display panel 110 is an edge at an end located in a direction opposite to the one end of the display panel 110. The supporter 130 may function as a handle. For example, when the display panel 110 is rolled and accommodated in the rolling part 120, the display panel 110 may be unrolled by pulling the supporter 130. The supporter 130 may be divided into a plurality of parts 131, 132, and 133. For example, the supporter 130 may be divided into a first part 131, a second part 132, and a third part 133. At least one of the plurality of parts of the supporter 130 may include a first connector (not illustrated). Since the first connector included in the supporter 130 may have the same operating principle and effect as the first connector included in the rolling part 120, detailed description thereof will be omitted.

The plurality of anchor areas 141 may be disposed inside the vehicle or in the anchor body 140, which will be described below. Each of the plurality of anchor areas 141 may be configured so that at least one area of the rolling part 120 and at least one area of the supporter 130 are detachable. For example, the third part 123 of the rolling part 120 and the third part 133 of the supporter 130 may be configured to be attached and detachable to and from the anchor area 141. When the at least one area of the rolling part 120 and the at least one area of the supporter 130 are attached to the plurality of anchor areas 141, an unrolled state of the display panel 110 may be fixed. That is, the plurality of anchor areas 141 may be configured to allow the user to adjust a size of the display panel 110. Although the plurality of anchor areas 141 are illustrated in a circular shape in the drawing, it is to be noted that this is for convenience of description. Each of the plurality of anchor areas 141 may include a second connector (not illustrated).

The second connector may be electrically connected to the first connector. The second connector and the first connector may be configured in the form of a plug or jack. Alternatively, the second connector and the first connector may be connected using a magnet and electrically connected to each other using short-distance wireless communication. The second connector may be connected to the first connector to transmit or receive an electrical signal to or from the display panel 110. The second connectors included in the plurality of anchor areas 141 may have different connection pins. Since the second connectors have the different connection pins, the display panel 110 may receive information from the different second connectors. That is, the second connector may be configured to allow the display panel 110 to distinguish between the different second connectors.

Since the display panel 110 receive information on the different second connectors, the display panel 110 may determine whether the first connector is connected to the second connector at a certain position. For example, when the display panel 110 is mounted on the anchor areas 141 located in a cluster and a center fascia of the vehicle as can be seen in FIGS. 5 and 6, the display panel 110 may be determined to have been mounted on the anchor areas 141 located in the cluster and center fascia of the vehicle. In this case, the display panel 110 may serve as the cluster and the center fascia of the vehicle. That is, the display panel 110 may be configured to receive, from the second connector, information necessary for the cluster and the center fascia of the vehicle and display the information. On the other hand, when the display panel 110 is mounted on the anchor areas 141 located on a rear part of a seat or a roof of the vehicle as can be seen in FIGS. 7 and 8, the display panel 110 may be configured to display entertainment content.

The rollable display apparatus 100 according to the first embodiment can provide a plurality of pieces of content with only one display apparatus by providing different information to the user depending on mounting positions of the display panel 110. In this case, the display panel 110 can provide content corresponding to a situation of the user. The rollable display apparatus 100 according to the first embodiment can provide an environment in which the user can select the number of display apparatus included in the vehicle by providing a plurality of pieces of content with only one display apparatus.

When the first connector included in the rolling part 120 and the first connector included in the supporter 130 are connected to different second connectors, the display panel 110 may be configured to recognize an unrolling partner of the display panel 110. For example, when the display panel 110 is unrolled to a size of eight inches and then mounted on the two anchor areas 141, the display panel 110 may recognize the two connected second connectors. The display panel 110 may determine that the display panel 110 has been unrolled to the size of eight inches on the basis of information received from the two recognized second connectors. The display panel 110 may be configured to modify and display information with resolution corresponding to the size of eight inches when a determination is made that the display panel 110 has been unrolled to the size of eight inches. On the other hand, the display panel 110 may be configured to modify and display information with a resolution corresponding to a size of 12 inches when the display panel 110 has been unrolled to the size of 12 inches and then mounted on the plurality of anchor areas 141.

The rollable display apparatus 100 according to the first embodiment is configured so that the size of the display panel 110 can be selected as necessary, thereby making it possible to provide content according to a position and purpose of the user.

As described above, it is possible to easily cope with a malfunction of the rollable display apparatus 100 by configuring the rollable display apparatus 100 so that the rollable display apparatus 100 is attachable and detachable inside the vehicle. For example, when the rollable display apparatus 100 fails, it is possible to separate and repair only a failing display apparatus without the need to disassemble the inside of the vehicle to replace or repair the display apparatus.

A plurality of anchor bodies 140 may be disposed inside the vehicle. For example, the anchor body 140 may be disposed in a cockpit, a ceiling, an armrest, or a rear part of a seat of the vehicle. The anchor body 140 may be integrated with the cockpit, the ceiling, the armrest, or the rear part of the seat of the vehicle. When the display panel 110 is rolled and completely accommodated in the rolling part 120, the anchor body 140 may include an internal space 142 that accommodates the rolling part 120 and the supporter 130. The anchor body 140 may include a button (not illustrated). When the button is pressed, the anchor body 140 may be configured to discharge the rolling part 120 and the supporter 130 accommodated in the internal space 142 of the anchor body 140.

As described above, it is possible to efficiently utilize the inner space of the vehicle so that the rollable display apparatus 100 can be accommodated in the anchor body 140. For example, when the user stops usage of the rollable display apparatus 100 according to the present disclosure, the rollable display apparatus 100 is accommodated in the anchor body 140, so that the rollable display apparatus 100 can be hidden from the field of view of the user.

Figure 4:
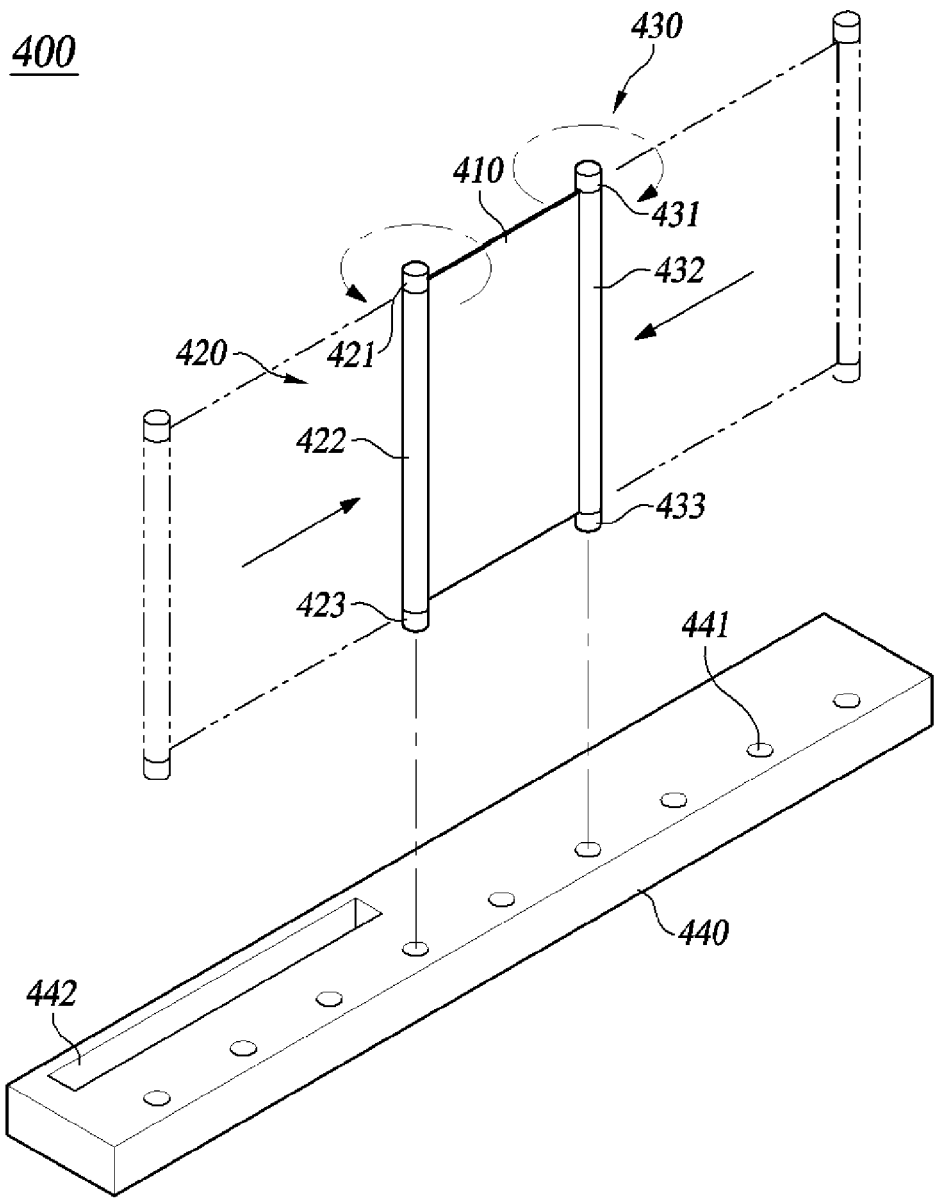
FIG. 4 is a perspective view of a rollable display apparatus according to a second embodiment of the present disclosure.

FIG. 4 is a perspective view of the rollable display apparatus according to a second embodiment of the present disclosure.

Referring to FIG. 4, the rollable display apparatus according to the second embodiment of the present disclosure may include all or some of a display panel 410, a first rolling part 420, a second rolling part 430, a plurality of anchor areas 441, and an anchor body 440.

Since components according to the second embodiment of the present disclosure may be the same as the components according to the first embodiment except for components to be particularly described below, detailed description of the same parts will be omitted.

The first rolling part 420 may be located at one end of the display panel 410. The first rolling part 420 may include an internal space in which a portion of the display panel 410 is rolled and accommodated. The first rolling part 420 may be a long bar. A length of the first rolling part 420 may be longer than a length of the one end of the display panel 410. The first rolling part 420 may be divided into a plurality of parts 421, 422, and 423. At least one of the plurality of parts 421, 422, and 423 of the first rolling part 420 may include a first connector (not illustrated).

The second rolling part 430 may be located at the other end of the display panel 410. The second rolling part 430 may include an internal space in which all but a portion of the display panel 410 rolled on and accommodated in the first rolling part 420 is rolled and accommodated. The second rolling part 430 may be a long bar. A length of the second rolling part 430 may be larger than the length of the one end of the display panel 410. The second rolling part 430 may be divided into a plurality of parts 431, 432, and 433. At least one of the plurality of parts 431, 432, and 433 of the second rolling part 430 may include a first connector (not illustrated).

The rollable display apparatus 400 according to the second embodiment of the present disclosure may be configured so that the display panel 110 is rolled or unrolled in both directions, unlike the rollable display apparatus 100 according to the first embodiment of the present disclosure. Accordingly, the rollable display apparatus may be configured using a larger display panel as compared to the rollable display apparatus 100 according to the first embodiment.

Figure 9:
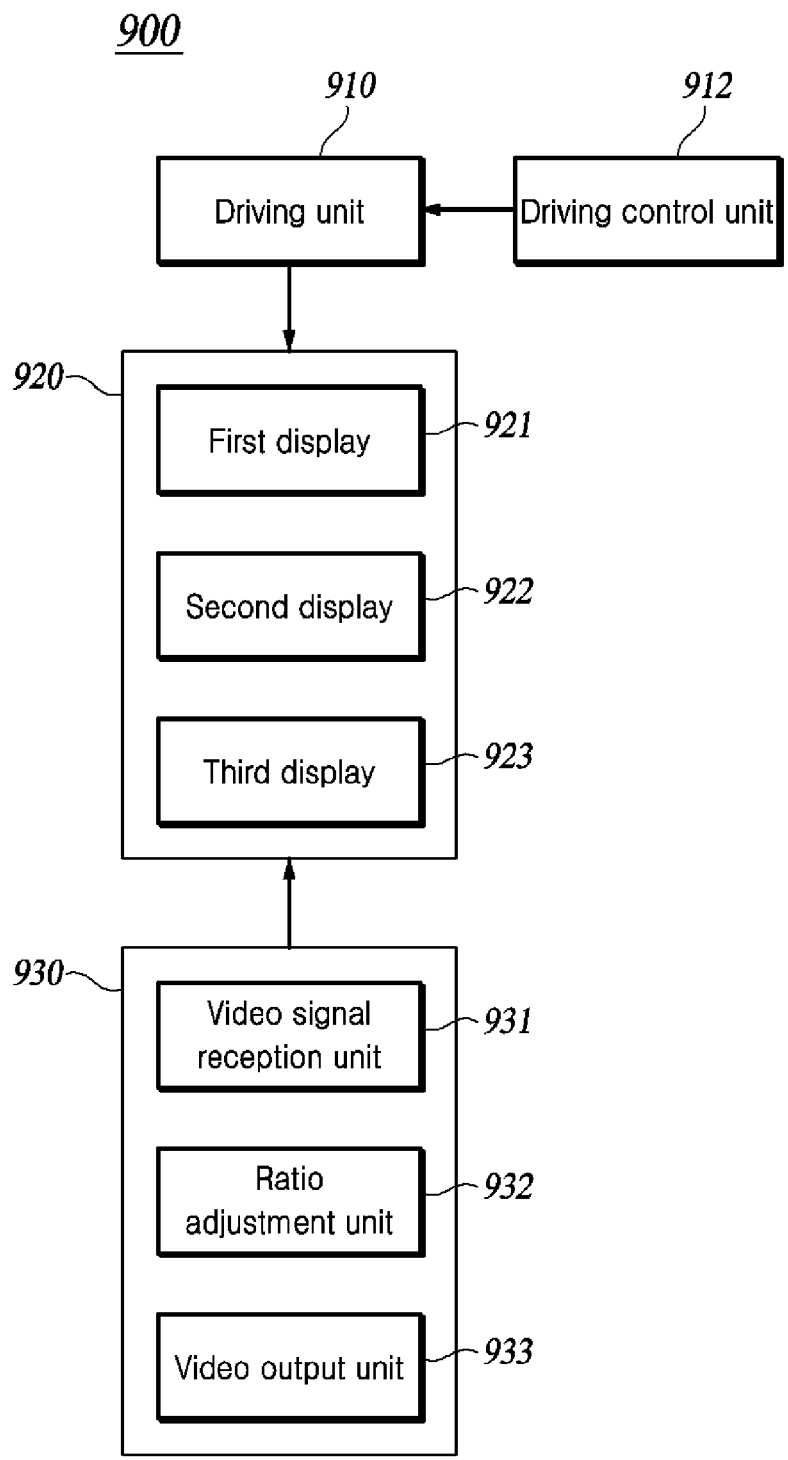
FIG. 9 is a block configuration diagram illustrating a configuration of a rollable display apparatus according to another embodiment of the present invention.

FIG. 9 is a block configuration diagram illustrating a configuration of a rollable display apparatus according to another embodiment of the present invention.

Referring to FIG. 9, a rollable display apparatus 900 according to another embodiment of the present invention includes some or all of a drive unit 910, a drive control unit 912, a plurality of displays 920, and a display control unit 930.

The drive unit 910 is disposed inside a housing (not illustrated) formed in a cockpit 1200 of the vehicle. The drive unit 910 is formed to move each of the plurality of displays 920 in a second direction and/or a third direction. The drive unit 910 is formed so that the plurality of displays 920 move along a longitudinal direction of the cockpit 1200. The drive unit 910 may include a rail structure to move the plurality of displays 920. Here, the second direction and the third direction are opposite directions. A direction perpendicular to one surface of the cockpit 1200, that is, a direction in which the plurality of displays 920 are exposed by being rolled or slid is a first direction. The second and third directions are directions perpendicular to the first direction.

In one embodiment, the drive control unit 912 may include a processor (e.g., computer, microprocessor, CPU, ASIC, circuitry, logic circuits, etc.) and an associated non-transitory memory storing software instructions which, when executed by the processor, provides the functionalities of the drive control unit 912 described hereinafter.

The drive control unit 912 may control integration between the plurality of displays 920 by moving each of the plurality of displays 920 in the second direction and/or the third direction. For example, the drive control unit 912 may perform control so that a position of each of the plurality of displays 920 can be determined on the rail structure of the drive unit 910.

The plurality of displays 920 includes a first display 921, a second display 922, and a third display 923.

The first display 921 is located on one side of the drive unit 910. The third display 923 is located on the other side of the drive unit 910. The second display 922 is located in the middle of the first display 921 and the third display 923 on the drive unit 910. For example, the first display 921 may be a display located on the cluster. The second display 922 may be a display located on the center fascia. The third display 923 may be a display located in front of a passenger seat. The plurality of displays 920 according to an embodiment of the present invention will be described as, for example, three displays. However, this is only an embodiment, and there may be a larger or smaller number of displays.

The plurality of displays 920 may form a first integrated display 1500 or a second integrated display 1700 on the basis of an integration state.

The first integrated display 1500 is one display in which at least two of the first to third displays 921 to 923 are integrated. For example, in the first integrated display 1500, the first display 921 and the second display 922 are integrated or the second display 922 and the third display 923 are integrated. The first integrated display 1500 may be moved in the second or third direction along the longitudinal direction of the cockpit 1200 and located at any one point.

The second integrated display 1700 is one display in which all of the first to third displays 921 to 923 are integrated. For example, in the second integrated display 1700, the integration may be made with any one of the positions of the first display 921, the second display 922, and the third display 923 as a reference. The second integrated display 1700 may be moved in the second or third direction along the longitudinal direction of the cockpit 1200 and located at any one point.

The display control unit 930 includes a video signal reception unit 931, a ratio adjustment unit 932, and a video output unit 933.

In one embodiment, the display control unit 930 may include a processor (e.g., computer, microprocessor, CPU, ASIC, circuitry, logic circuits, etc.) and an associated non-transitory memory storing software instructions which, when executed by the processor, provides the functionalities of the video signal reception unit 931, the ratio adjustment unit 932, and the video output unit 933. The processor may take the form of one or more processor(s) and associated memory storing program instructions.

The video signal reception unit 931 receives video information that that is displayed on each of the plurality of displays 920. Here, the video information includes, for example, position information of surrounding vehicles, navigation information, shared screen information in which a screen of another device is shared for an output, and entertainment information including a variety of entertainment.

The ratio adjustment unit 932 adjusts a video ratio of the plurality of displays 920. The ratio adjustment unit 932 may adjust a ratio of video pieces of information that are output to the first display 921, the second display 922, and the third display 923. Further, the ratio adjustment unit 932 may adjust a video ratio of the first integrated display 1500 and the second integrated display 1700. The video ratio of the first integrated display 1500 corresponds, for example, to a size of at least two integrated displays. The video ratio of the second integrated display 1700 corresponds to, for example, a display size of the first to third integrated displays 921 to 923.

The video output unit 933 outputs a video on the display whose video ratio has been adjusted by the ratio adjustment unit 932. The video output unit 933 outputs the video to some or all of the first display 921, the second display 922, and the third display 923 on the basis of an output signal adjusted by the ratio adjustment unit 932.

Figure 10:
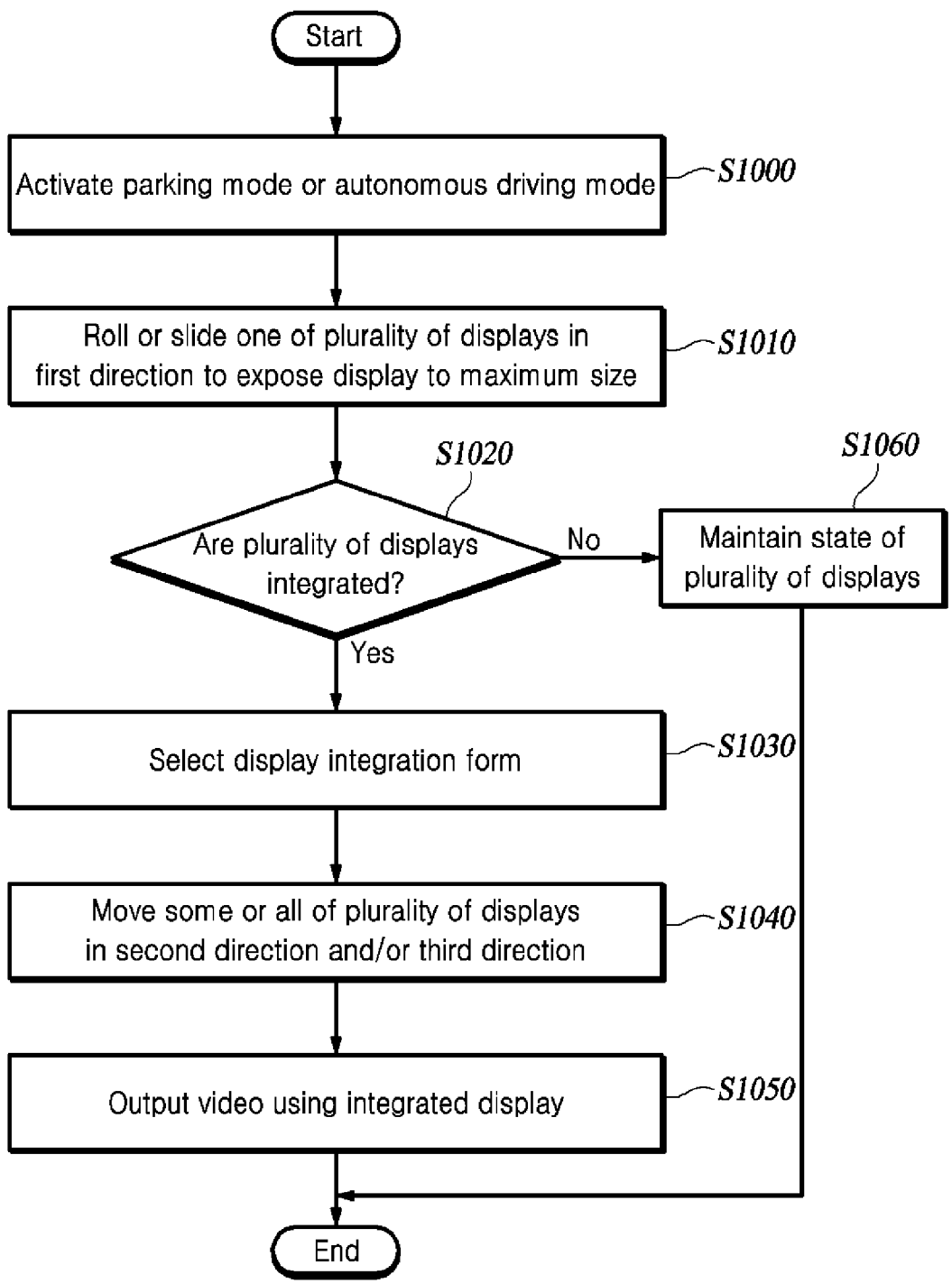
FIG. 10 is a flowchart illustrating a display control method according to another embodiment of the present invention.

FIG. 10 is a flowchart illustrating a display control method according to an embodiment of the present invention.

Referring to FIG. 10, it is sensed that a parking mode or an autonomous driving mode has been activated in the vehicle (S1000).

One of the plurality of displays 920 is rolled or slid in the first direction and exposed to a maximum size (S1010). One of the plurality of displays 920 arranged side by side with the longitudinal direction of the cockpit 1200 of the vehicle as a reference is rolled or slid in the first direction and exposed to the maximum size. Here, the first direction is a direction perpendicular to the one side of the cockpit 1200.

A determination is made as to whether the plurality of displays 920 are integrated (S1020). The display control unit 930 may determine whether or not the plurality of displays 920 are integrated on the basis of position information of the occupant. For example, the display control unit 930 may determine whether or not the displays are optimally integrated on the basis of position information of an occupant, by using a sensor (not illustrated) that senses whether or not a user is seated on a seat included inside the vehicle.

When a determination is made in step S1020 that the integration of the plurality of displays 920 is necessary, a display integration form is selected (S1030). The integration form of the displays according to an embodiment of the present invention may include first to fifth integration forms on the basis of the integration form of the plurality of displays 920.

For example, the first integration form refers to integration of the first display 921 and the second display 922 among the plurality of displays 920. The second integration form refers to integration of the second display 922 and the third display 923 among the plurality of displays 920. The third integration form refers to integration of the first to third displays 921 to 923 on the basis of a position of the first display 921 among the plurality of displays 920. The fourth integration form refers to integration of the first to third displays 921 to 923 on the basis of the position of the second display 922 among the plurality of displays 920. The fifth integration form refers to integration of the first to third displays 921 to 923 on the basis of the position of the third display 923 among the plurality of displays 920. The first to fifth integration forms according to an embodiment of the present invention are described with three displays as references. However, this is only one embodiment, and in another embodiment, there may be a smaller or larger number of displays.

Some or all of the plurality of displays 920 are moved in the second direction and/or the third direction (S1040). When a determination is made that the parking mode or the autonomous driving mode of the vehicle has been activated, the plurality of displays 920 may be integrated with each other on the basis of position information of occupants in the vehicle. For example, when a determination is made that an occupant is located on a left front side or a right front side inside the vehicle, some or all of the plurality of displays 920 may be combined to the left side or right side along the longitudinal direction of the cockpit 1200.

The video is output using the integrated display (S1050). The video output unit 933 outputs a video using the first integrated display 1500 and the second integrated display 1700.

When a determination is made in step S1020 that the integration of the plurality of displays 920 is not necessary, a driving state of the plurality of displays 920 is maintained (S1060). When the integration of the plurality of displays 920 is not necessary, a state in which the first display 921, the second display 922, and the third display 923 are rolled or slid in the first direction is maintained.

Figure 11:
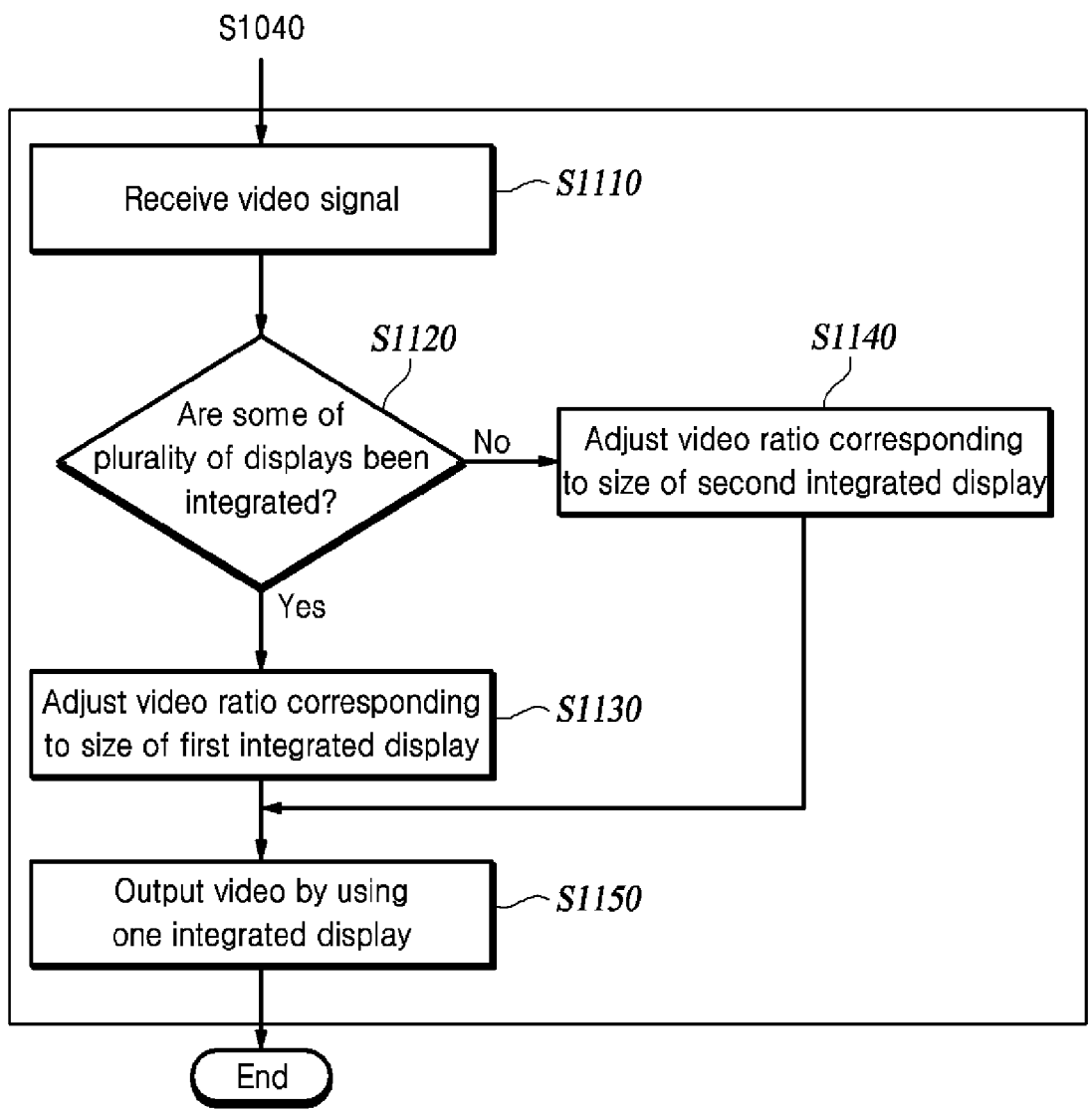
FIG. 11 is a flowchart specifically illustrating step S1050 of FIG. 10.

FIG. 11 is a flowchart specifically illustrating step S1050 of FIG. 10.

Referring to FIG. 11, a video signal is received (S1110). The video signal reception unit 931 receives a video signal including video information output to the integrated display.

A determination is made as to whether some of the plurality of displays 920 have been integrated (S1120). The display control unit 930 may determine whether some or all of the plurality of displays 920 have been integrated.

When a determination is made in step S1120 that some of the plurality of displays 920 have been integrated, a video ratio corresponding to a size of the first integrated display 1500 is adjusted (S1130). The first integrated display 1500 has a display size in which two of the plurality of displays 920 have been integrated. Accordingly, the ratio adjustment unit 932 may adjust the video ratio corresponding to the size of the first integrated display 1500.

When a determination is made in step S1120 that some of the plurality of displays 920 have not been integrated, a determination is made that all of the plurality of displays 920 have been integrated (S1140). Accordingly, the ratio adjustment unit 932 may adjust the video ratio corresponding to the size of the second integrated display 1700.

The video is output by using one integrated display (S1150). Here, the one integrated display includes the first integrated display 1500 or the second integrated display 1700. The video output unit 933 outputs the video on the basis of a video ratio based on the size of the first integrated display 1500 or the second integrated display 1700.

Figure 12:
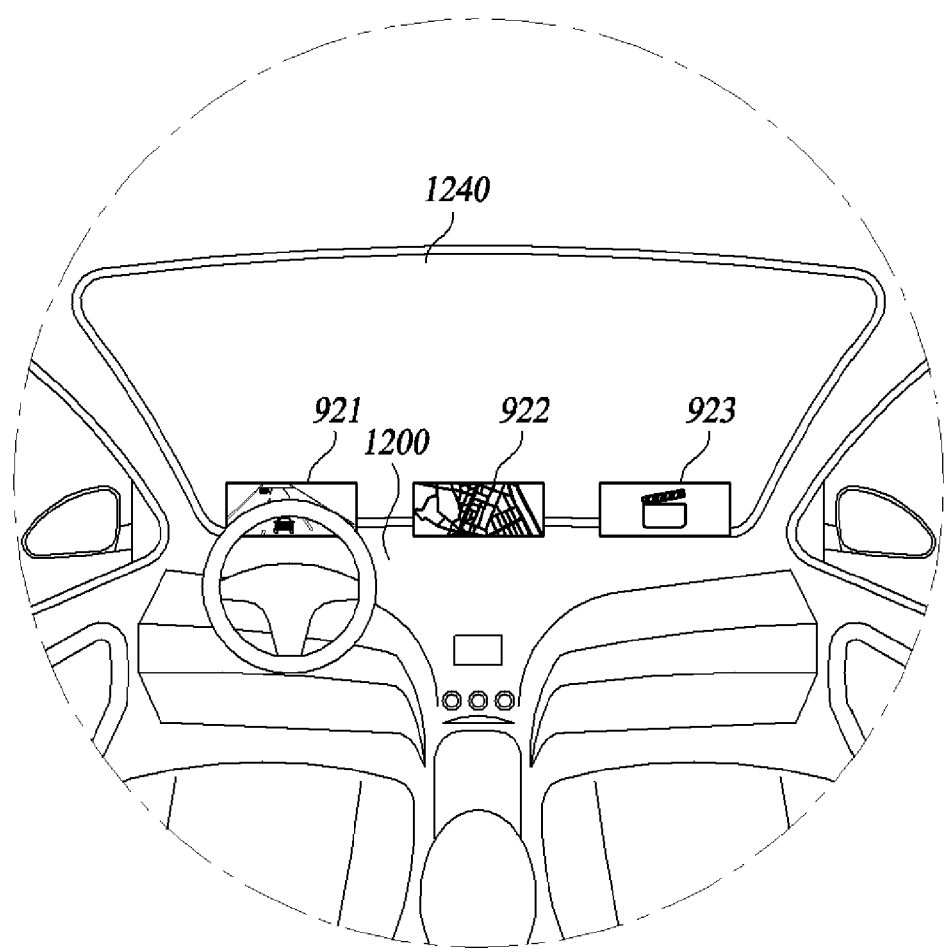
FIG. 12 is a diagram illustrating an operating state of a plurality of displays that output videos of a traveling vehicle according to another embodiment of the present invention.

FIG. 12 is a diagram illustrating an operating state of the plurality of displays 920 that output videos of a traveling vehicle according to an embodiment of the present invention.

Referring to FIG. 12, when the user is driving by manipulating a steering wheel, a forward viewing angle corresponding to a windshield 1240 of the vehicle should be secured. Accordingly, the first to third displays 921 to 923 all output video information necessary for traveling on the basis of a state in which the displays are rolled or slid by a predetermined height. For example, the first display 921 may output position information of a traveling vehicle. The second display 922 may output navigation information. The third display 923 may output an entertainment video. Here, the video information output to each of the first to third displays 921 to 923 is only an example, and the present disclosure is not limited thereto. This is only an embodiment, and in another embodiment, video information different from the video information illustrated in FIG. 12 may be output on each of the first to third displays 921 to 923.

Figure 13:
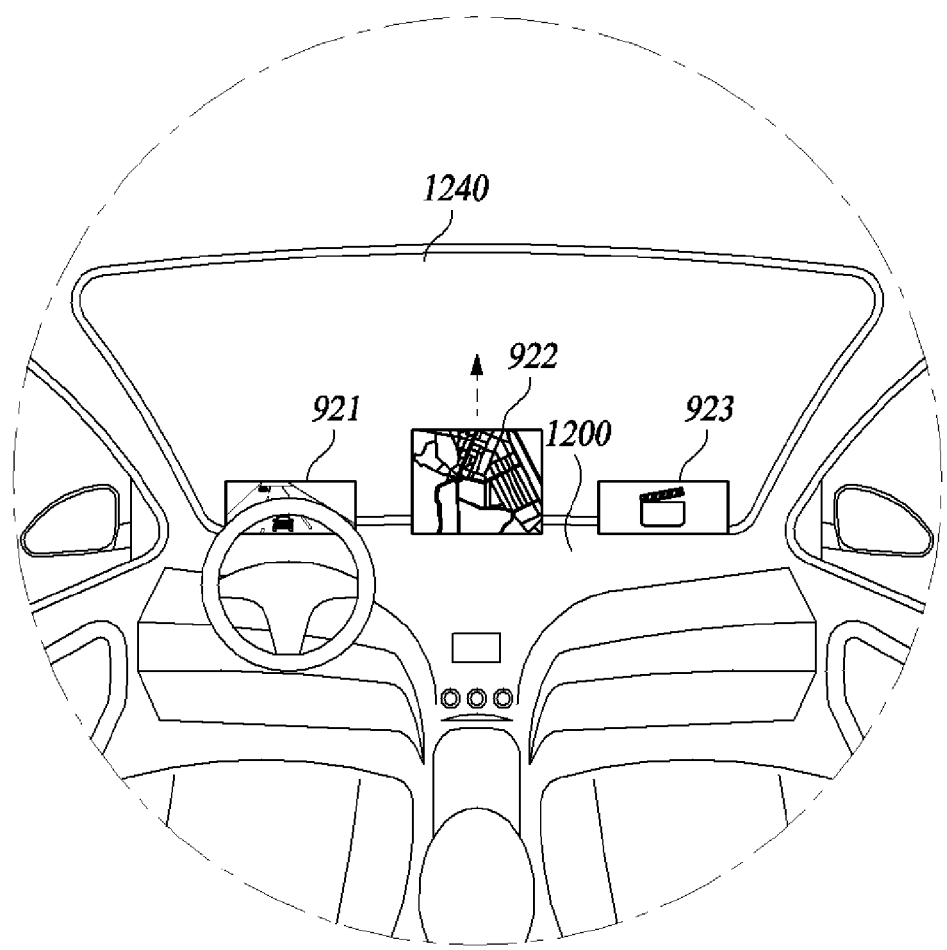
FIG. 13 is a diagram illustrating an operating state of a second display in which the display is rolled or slid to a maximum size according to another embodiment of the present invention.

FIG. 13 is a diagram illustrating an operating state of the second display 922 in which the display is rolled or slid to the maximum size according to an embodiment of the present invention.

Referring to FIG. 13, when the parking mode or the autonomous driving mode of the vehicle has been activated, the second display 922 among the plurality of displays 920 may be rolled or slid to the maximum size. Passengers of the vehicle, including a driver, can view various types of video information using the second display 922 exposed to the maximum size.

Figure 14:
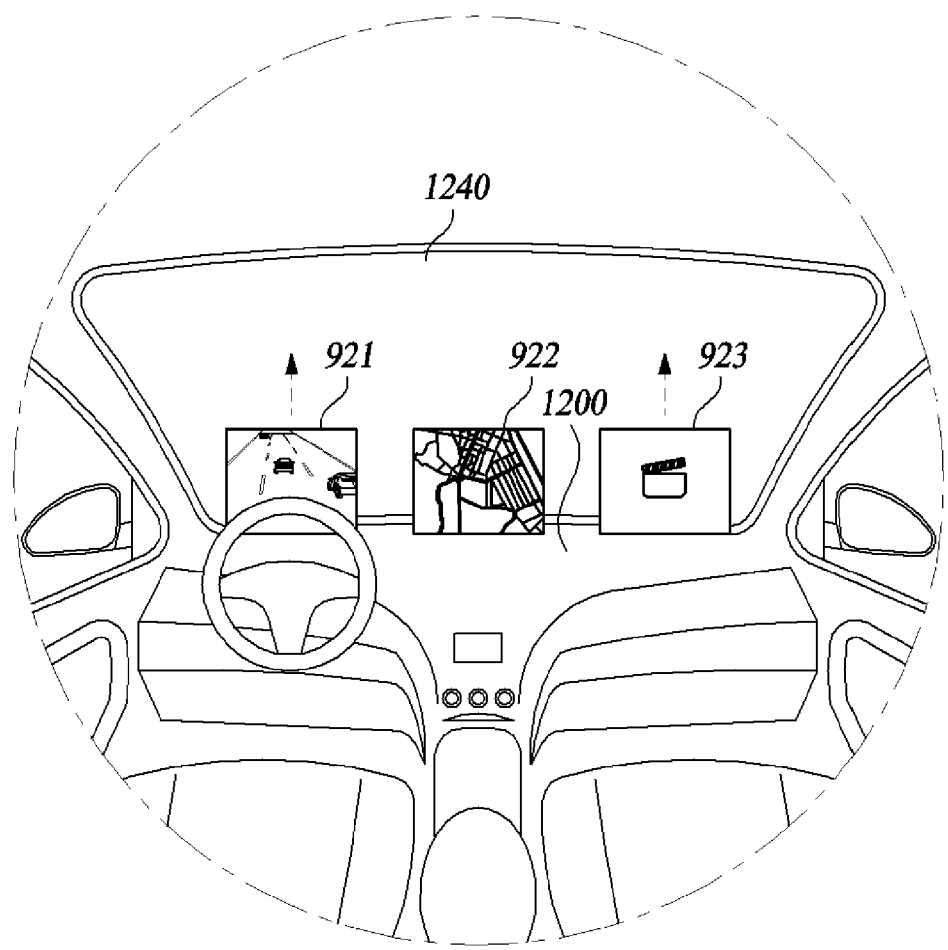
FIG. 14 is a diagram illustrating an operating state of a plurality of displays in which a parking mode or an autonomous driving mode is activated according to another embodiment of the present invention.

FIG. 14 is a diagram illustrating an operating state of the plurality of displays 920 in which the parking mode or the autonomous driving mode has been activated according to an embodiment of the present invention.

Figure 15:
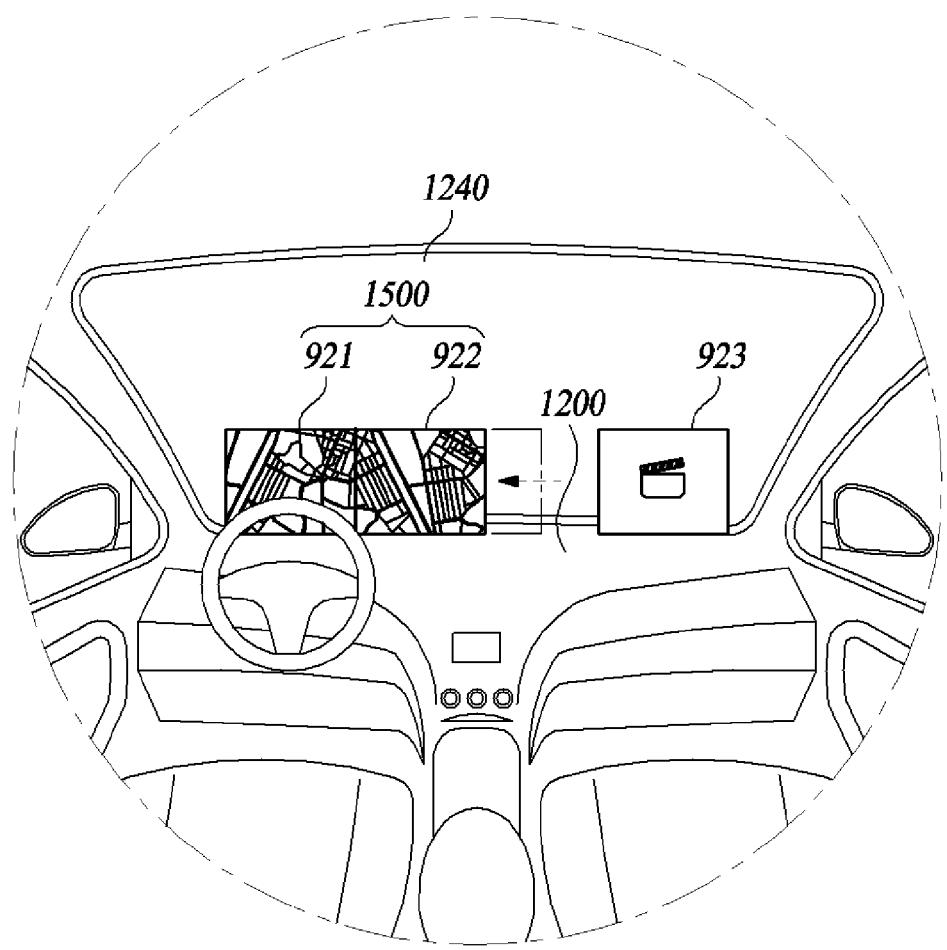
FIG. 15 is a diagram illustrating an operating state in which a video is output by using a first integrated display according to another embodiment of the present invention.

FIG. 15 is a diagram illustrating operating state in which a video is output by using the first integrated display 1500 according to an embodiment of the present invention.

Referring to FIGS. 13 to 15, after the second display 922 is exposed to a maximum size, the first display 921 and the third display 923 are also rolled or slid to a maximum size. The plurality of displays 920 may determine whether or not the plurality of displays 920 have been integrated by using an operation of the user or sensors disposed inside the vehicle. Here, the integration form of the plurality of displays 920 may be a form of the first integrated display 1500. The second display 922 may be moved toward the first display 921 along the drive unit 910 with the position of the first display 921 as a reference and integrated with the first display 921.

In FIG. 15, a case where the second display 922 moves toward the first display 921 and the first display 921 and the second display 922 are integrated has been illustrated, but the first integrated display 1500 is not limited. In the first integrated display 1500, either the first display 921 or the third display 923 may be integrated with the second display 922 with the position of the second display 922 as a reference. Further, the second display 922 may be integrated with the third display 923 with the position of the third display 923 as a reference.

Figure 16:
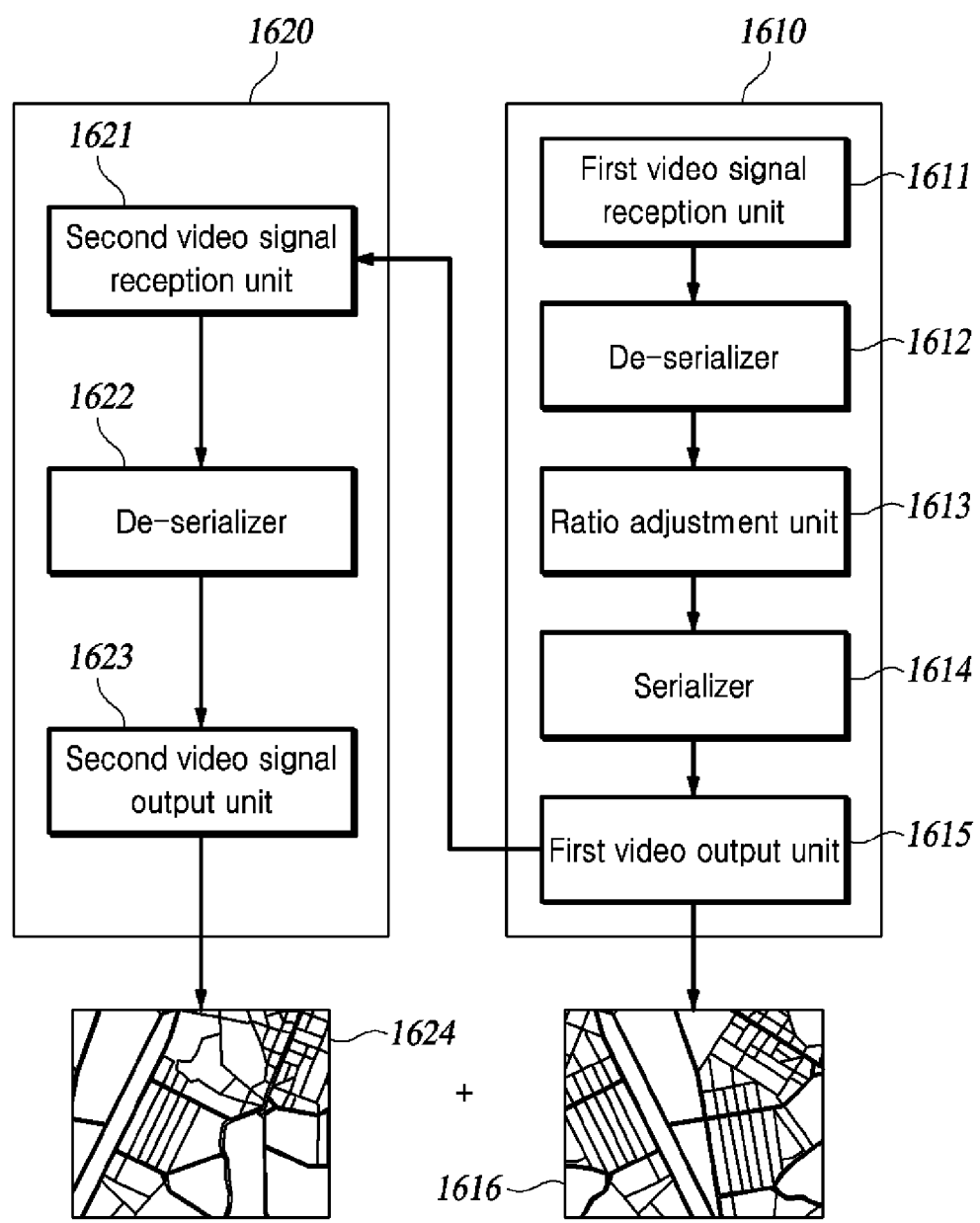
FIG. 16 is a block configuration diagram briefly illustrating a configuration of a main control unit and an auxiliary control unit for adjusting a video ratio in the integrated display according to another embodiment of the present invention.

FIG. 16 is a block configuration diagram briefly illustrating a configuration of the main control unit and the auxiliary control unit for adjusting a video ratio of the integrated display according to an embodiment of the present invention.

Referring to FIGS. 15 and 16, the rollable display apparatus 900 may further include a main control unit 1610 and an auxiliary control unit 1620.

The main control unit 1610 includes a first video signal reception unit 1611, a ratio adjustment unit 1613, and a first video output unit 1615. The main control unit 1610 may be an electronic control unit disposed in any one of the first to third displays 921 to 923. Hereinafter, a case in which the main control unit 1610 is disposed in the second display 922 among the first to third displays 921 to 923 will be described.

When the second display 922 is integrated with the first display 921 or the third display 923 to form the first integrated display 1500, the main control unit 1610 may adjust a ratio of a video. For example, the main control unit 1610 receives a video signal to be output to the first integrated display 1500 by using the first video signal reception unit 1611.

The de-serializers 1612 and 1622 de-serialize the serialized video signal received by the first video signal reception unit 1611.

The ratio adjustment unit 1613 adjusts the de-serialized video signal to a video ratio corresponding to a screen size of the first display 921 and the second display 922. A serializer 1614 serializes the video signal on the basis of the adjusted video ratio and transmits the resultant video ratio to the first video output unit. The first video output unit may output a video at a first video ratio by using, for example, the second display 922.

The auxiliary control unit 1620 includes a second video signal reception unit 1621 and a second video output unit 1623.

The auxiliary control unit 1620 is disposed on the first display 921 and the third display 923. Although only one auxiliary control unit 1620 is illustrated in FIG. 9, the number of auxiliary control units 1620 may be proportional to the number of displays 920. For example, when the main control unit 1610 is an electronic control unit of the second display 922, the auxiliary control unit 1620 may be an electronic control unit of each of the first display 921 and the second display 922.

The second video signal reception unit 1621 may receive the video signal output from the first video output unit of the main control unit 1610. The de-serializer 822 de-serializes the video information received by the second video signal reception unit 1621 and transmits the resultant video information to the second video output unit. The second video output unit may output the video at a second video ratio by using the first display 921. Accordingly, the first integrated display 1500 may output video information on the basis of the first video ratio and the second video ratio by using the first display 921 and the second display 922.

Figure 17:
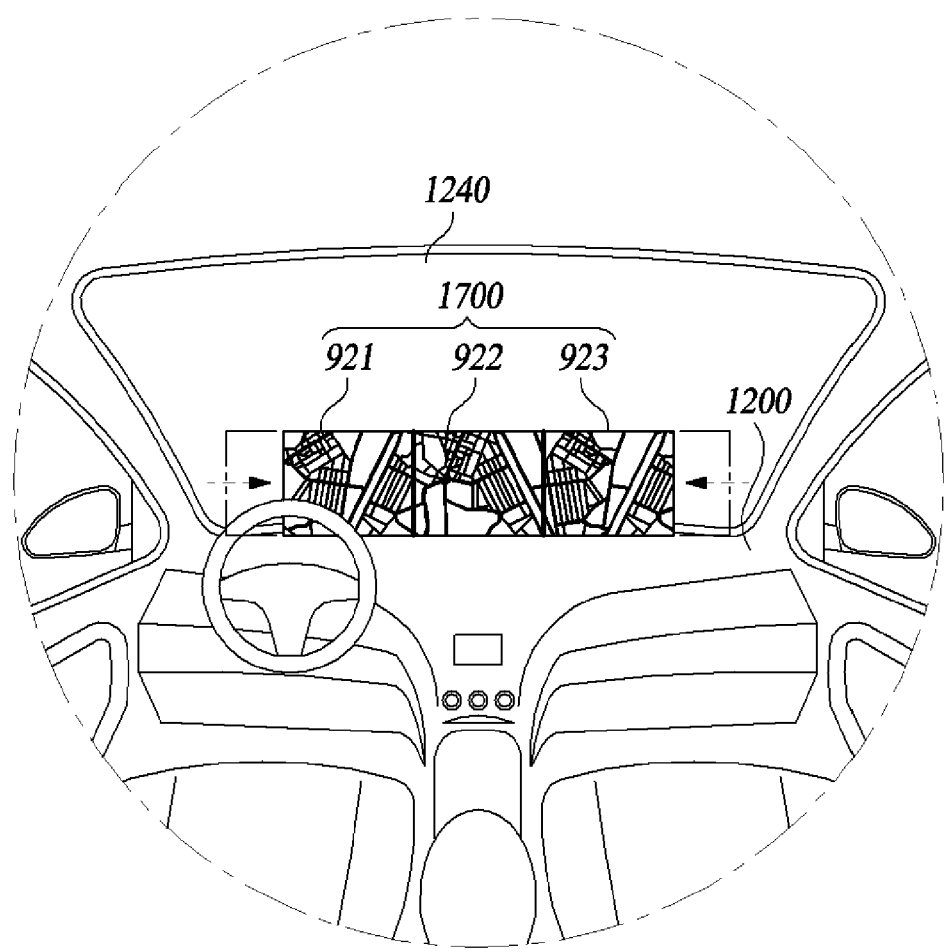
FIG. 17 is a diagram illustrating an operating state in which video information is output by using a second integrated display according to another embodiment of the present invention.

FIG. 17 is a diagram illustrating operating state in which video information is output by using the second integrated display 1700 of the present invention.

Referring to FIG. 17, the plurality of displays 920 may be all integrated to form the second integrated display 1700. The second integrated display 1700 may have a largest size as compared with the plurality of displays 920. In FIG. 9, the second integrated display 1700 in which the first display 921 and the third display 923 are moved toward and integrated with the second display 922 with the position of the second display 922 as a reference has been illustrated, but the present disclosure is not limited thereto. The second integrated display 1700 may be located at any one place on the rail structure of the drive unit 910.

Although not illustrated in FIG. 17, the second integrated display 1700 adjusts the video ratio using the same control method as the control method for adjusting the video ratio of the first integrated display 1500. For example, the video information may be output using the first to third displays 921 to 923 on the basis of the video signal to be output to the second integrated display 1700.

What is claimed is:

1. A rollable display apparatus disposed in a vehicle, comprising:
    a display panel configured to display a video;
    a rolling part located at one end of the display panel and including an internal space in which the display panel is rolled and accommodated;
    a supporter located at another end of the display panel; and
    an anchor body configured such that at least one area of the rolling part and at least one area of the supporter are detachable from the anchor body, and comprising a plurality of anchor areas configured to maintain an unrolled state of the display panel when the at least one area of the rolling part and the at least one area of the supporter are attached to the anchor body.

2. The rollable display apparatus of claim 1, wherein:
    the rolling part includes a first connector to transmit and receive an electrical signal to and from the display panel, and
    each of the plurality of anchor areas includes a second connector electrically connected to the first connector.

3. The rollable display apparatus of claim 2, wherein, the plurality of anchor areas are configured such that the second connectors have connection pins that are differently arranged from each other so that the display panel recognizes attachment positions of the first connectors and an unrolled state of the display panel.

4. The rollable display apparatus of claim 1, wherein:
    the supporter includes a first connector to transmit and receive an electrical signal to and from the display panel, and
    each of the plurality of anchor areas includes a second connector electrically connected to the first connector.

5. The rollable display apparatus of claim 4, wherein, the plurality of anchor areas are configured such that the second connectors have connection pins that are differently arranged from each other so that the display panel recognizes attachment positions of the first connector and an unrolled state of the display panel.

6. The rollable display apparatus of claim 1, wherein the anchor body includes the internal space configured to accommodate the rolling part and the supporter.

7. The rollable display apparatus of claim 1, wherein the anchor body is integrated with a cockpit, a ceiling, an armrest, and a rear part of a seat of the vehicle.

8. A rollable display apparatus disposed in a vehicle, comprising:
    a display panel configured to display a video;
    a rolling part located at one end of the display panel and including an internal space in which the display panel is rolled and accommodated;
    a supporter coupled to another end of the display panel; and a plurality of anchor areas disposed inside the vehicle, configured such that at least one area of the rolling part and at least one area of the supporter are detachable from the plurality of anchor areas, and configured to maintain an unrolled state of the display panel when the at least one area of the rolling part and the at least one area of the supporter are attached to the plurality of anchor areas.

9. A rollable display apparatus comprising:

a display panel configured to display a video;

a first rolling part coupled to one end of the display panel and including an internal space in which a portion of the display panel is rolled and accommodated;

a second rolling part coupled to another end of the display panel and including an internal space in which a portion other than the portion of the display panel that is rolled and accommodated in the first rolling part is rolled and accommodated; and an anchor body including a plurality of anchor areas, the anchor areas configured such that at least one area of the first rolling part and at least one area of the second rolling part are detachable from the anchor body, and configured to maintain an unrolled state of the display panel when the at least one area of the first rolling part and the at least one area of the second rolling part are attached to the anchor body.

* * * * *